US012664068B2

(12) United States Patent
Rajamanickam et al.

(10) Patent No.: US 12,664,068 B2
(45) Date of Patent: Jun. 23, 2026

(54) METHODS AND APPARATUS FOR REAL-TIME TRIP SEQUENCE DETECTION FOR CASCADED TRIP EVENTS

(71) Applicant: Texas Instruments Incorporated, Dallas, TX (US)

(72) Inventors: Karthikeyan Rajamanickam, Bangalore (IN); Venkatesh Natarajan, Bangalore (IN); Manish Bhardwaj, Poughkeepsie, NY (US)

(73) Assignee: Texas Instruments Incorporated, Dallas, TX (US)

( * ) Notice: Subject to any disclaimer, the term of this patent is extended or adjusted under 35 U.S.C. 154(b) by 8 days.

(21) Appl. No.: 18/217,169

(22) Filed: Jun. 30, 2023

(65) Prior Publication Data

US 2024/0362146 A1     Oct. 31, 2024

Related U.S. Application Data

(60) Provisional application No. 63/461,656, filed on Apr. 25, 2023.

(51) Int. Cl.
G06F 11/34 (2006.01)

(52) U.S. Cl.
CPC ........ G06F 11/348 (2013.01); G06F 11/3476 (2013.01); *G06F 2201/88* (2013.01)

(58) Field of Classification Search
CPC . G06F 11/348; G06F 11/3476; G06F 2201/88
See application file for complete search history.

(56) References Cited

U.S. PATENT DOCUMENTS

| | | | | |
|---|---|---|---|---|
| 9,530,513 | B1 * | 12/2016 | Pan | G11C 11/5628 |
| 2002/0032535 | A1 * | 3/2002 | Alexander | G01R 21/133 |
| | | | | 702/64 |
| 2009/0228902 | A1 * | 9/2009 | Hacking | G06F 11/30 |
| | | | | 719/318 |
| 2020/0151056 | A1 * | 5/2020 | Chen | G06F 11/1068 |
| 2021/0175743 | A1 * | 6/2021 | Cox | H02J 13/00002 |
| 2021/0293871 | A1 * | 9/2021 | Defenbaugh | G01R 31/12 |
| 2022/0006665 | A1 * | 1/2022 | Kajuluri | H04W 4/48 |
| 2022/0376491 | A1 * | 11/2022 | Rostron | H02H 3/027 |

* cited by examiner

*Primary Examiner* — Jigar P Patel
(74) *Attorney, Agent, or Firm* — Michelle Murray; Frank D. Cimino

(57)     ABSTRACT

Systems, apparatus, articles of manufacture, and methods are disclosed for real-time trip sequence detection for cascaded trip events. An example integrated circuit device includes trip detector circuitry, a first counter, a first memory, a second counter, a second memory, and control circuitry in communication with the trip detector circuitry, the control circuitry to, in response to a first trigger detected by the fault detector circuit, store a value of the first counter in the first memory, and in response to a second trigger detected by the fault detector circuit, store a value of the second counter in the second memory. The trip detector circuitry will continue the same detection, identification and counter storage logic for the subsequent triggers limited only by the available storage capacity.

21 Claims, 10 Drawing Sheets

Figure 5:
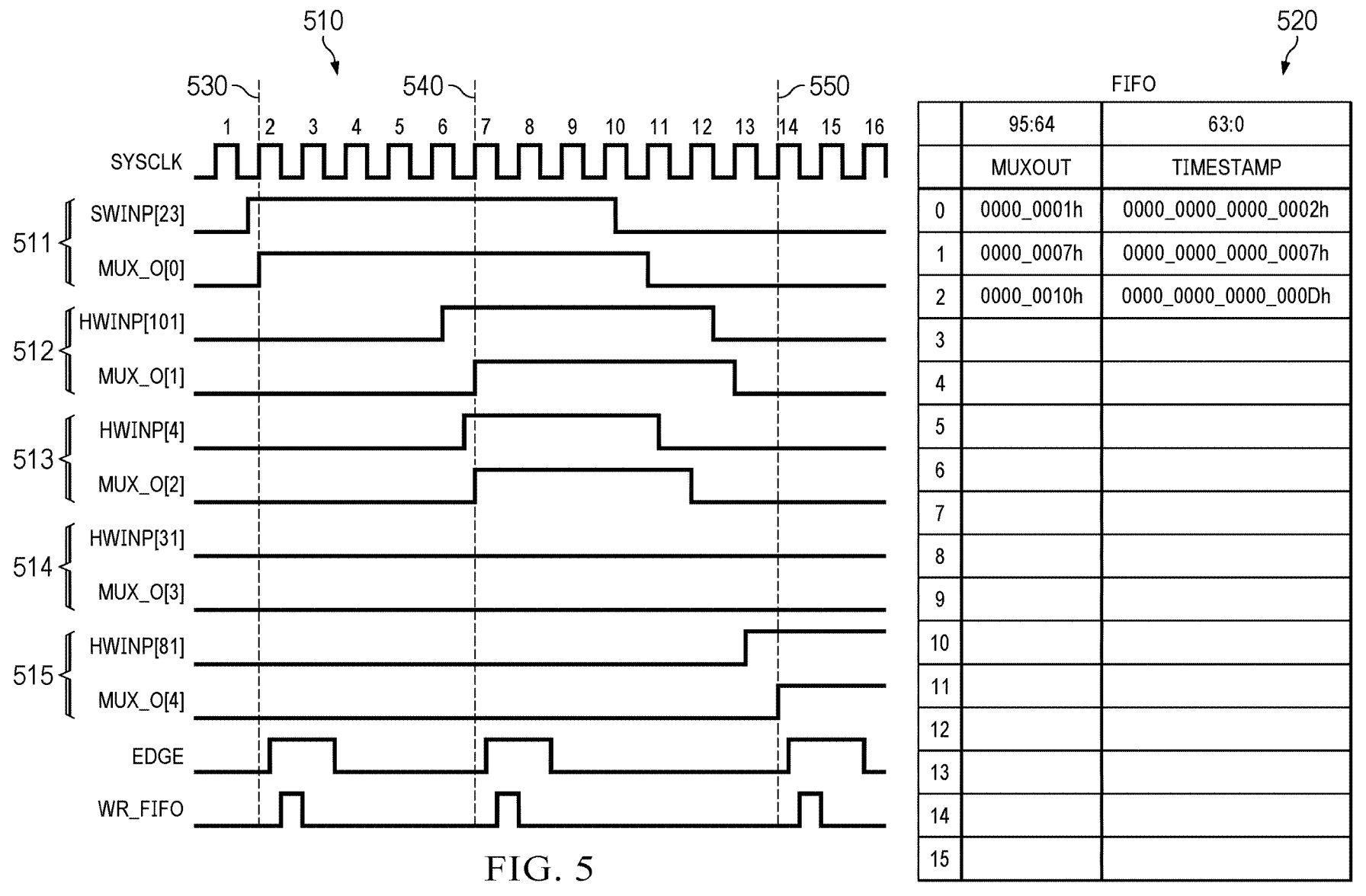

| | 95:64 | 63:0 |
|---|---|---|
| | MUXOUT | TIMESTAMP |
| 0 | 0000_0001h | 0000_0000_0000_0002h |
| 1 | 0000_0007h | 0000_0000_0000_0007h |
| 2 | 0000_0010h | 0000_0000_0000_000Dh |
| 3 | | |
| 4 | | |
| 5 | | |
| 6 | | |
| 7 | | |
| 8 | | |
| 9 | | |
| 10 | | |
| 11 | | |
| 12 | | |
| 13 | | |
| 14 | | |
| 15 | | |

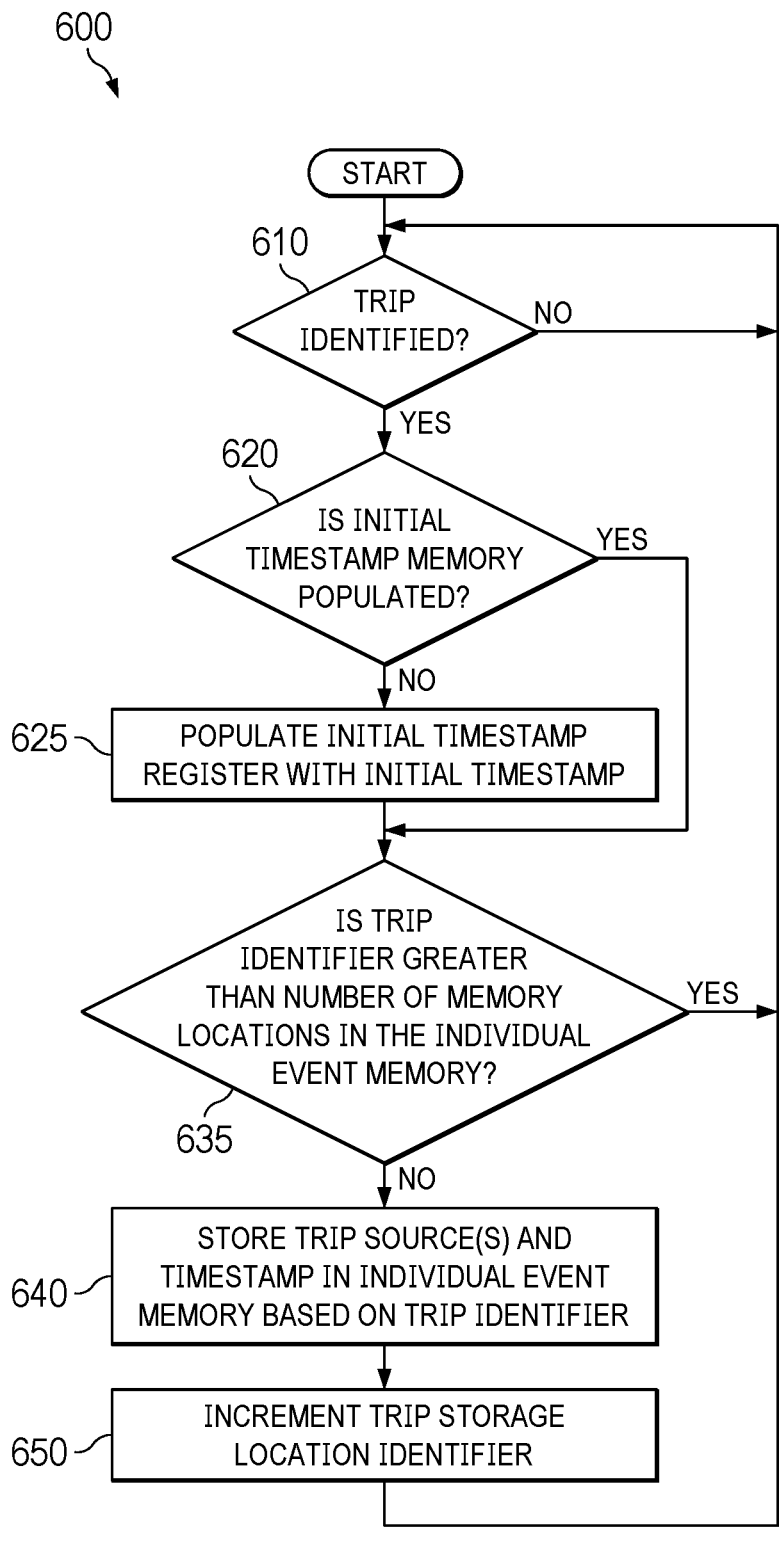

START

610

TRIP
IDENTIFIED?                          NO

YES

620

IS INITIAL
TIMESTAMP MEMORY                     YES
POPULATED?

NO

625    POPULATE INITIAL TIMESTAMP
REGISTER WITH INITIAL TIMESTAMP

IS TRIP
IDENTIFIER GREATER
THAN NUMBER OF MEMORY                YES
LOCATIONS IN THE INDIVIDUAL
EVENT MEMORY?

635

NO

640    STORE TRIP SOURCE(S) AND
TIMESTAMP IN INDIVIDUAL EVENT
MEMORY BASED ON TRIP IDENTIFIER

650    INCREMENT TRIP STORAGE
LOCATION IDENTIFIER

METHODS AND APPARATUS FOR REAL-TIME TRIP SEQUENCE DETECTION FOR CASCADED TRIP EVENTS

RELATED APPLICATION

This application claims the benefit of U.S. Provisional Patent Application No. 63/431,656, which was filed on Apr. 25, 2023. U.S. Provisional Patent Application No. 63/431, 656 is hereby incorporated herein by reference in its entirety. Priority to U.S. Provisional Patent Application No. 63/431, 656 is hereby claimed.

FIELD OF THE DISCLOSURE

This disclosure relates generally to event detection and, more particularly, to methods and apparatus for real-time trip sequence detection for cascaded trip events.

BACKGROUND

Understanding a root cause of a failure of a circuit is important for diagnostic purposes. As circuit complexity increases, circuits may fail for a number of different reasons including internal issues and/or external stimuli. In some situations, multiple different reasons for a failure may occur.

BRIEF DESCRIPTION OF THE DRAWINGS

FIG. 5 is a diagram illustrating an event timing waveform and the resultant storage of event information in the individual event memory of FIG. 1.

FIG. 6 is a flowchart representative of example machine readable instructions and/or example operations that may be executed, instantiated, and/or performed by example programmable circuitry to implement the trip logger circuitry of FIG. 1.

In general, the same reference numbers will be used throughout the drawing(s) and accompanying written description to refer to the same or like parts. The figures are not necessarily to scale.

Figure 1:
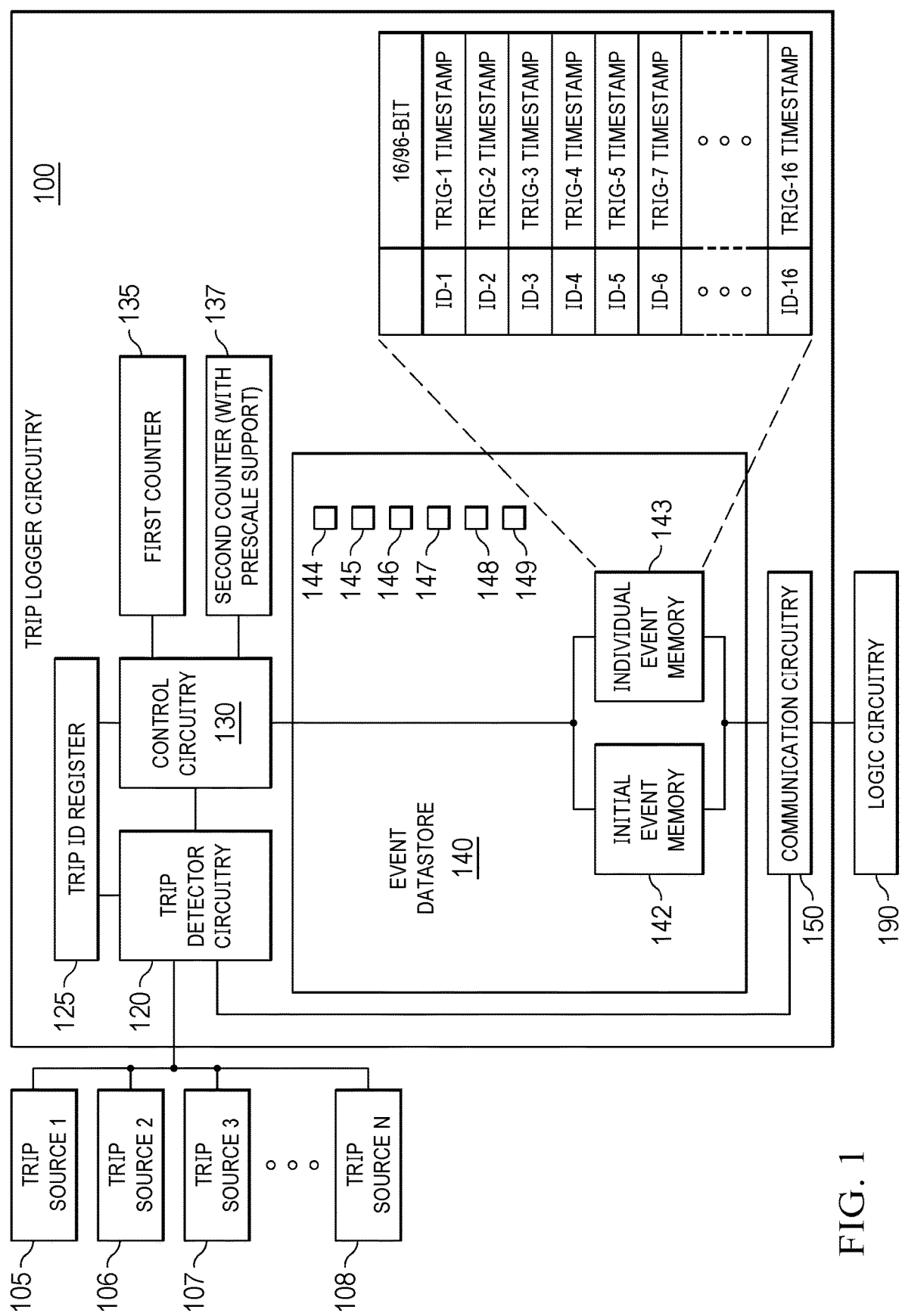
FIG. 1 is a block diagram of an example environment in which example trip logger circuitry operates to perform real-time trip sequence detection for cascaded trip events.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable micropro-cessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Realtime control systems involve a continuous loop of sensing, computation and activation. Such systems also have a continuous monitoring of various conditions of the system which could indicate some form of erroneous condition in the system. The system will have to be taken to a safe state when such erroneous conditions (also referred to as 'faults' are detected). The process of detecting erroneous conditions (or faults) and putting the system in a safe state is also referred to as a 'trip' action. In applications where a pulse width modulator (PWM) is driving a peripheral (e.g., a power converter, a motor) this may include causing the PWM outputs to drive an inactive or safe value.

Whenever a trip action occurs, understanding the root cause of a fault may be beneficial for determining the state of a circuit. For example, a failure arising out of an external stimulus to a circuit may indicate that the circuit was operating normally and that any subsequent faults were induced by the external stimulus. In such an example, causing the performance of a restorative action (e.g., restarting the circuit) may return the circuit to normal operation. In contrast, a failure arising out of an internal fault may indicate that the performance of such a restorative action might not return the circuit to normal operation (e.g., the circuit is damaged). In such examples, understanding the order in which faults occurred is important for directing next steps in operation of a circuit.

Enhanced pulse width modulation (ePWM) circuits are used in a wide range of applications including, for example, vehicular electronics, motor control, switching power converters, light emitting diode (LED) control, etc. In some situations, faults may occur in connection with an ePWM circuit. While examples disclosed herein are described in the context of trip detection associated with ePWM circuits, such trip detection approaches may be utilized with other non-ePWM circuits as well. As used herein, a failure of a circuit represents that a circuit is operating in a failed state. Such operation may be the result of and/or may be detected based on the occurrence of, a trip event. As used herein, a trip event is also referred to as a trip, a fault, a trigger, etc.

Such trip events represent occurrences or detection of events that occur in association with operation of a circuit.

In some examples, trip events (e.g., faults) from a variety of sources may be provided to a trip logger via and/or an ePWM module a crossbar circuit. Crossbar circuits, which provide a selected signal from a wider set of input signals, also referred to as X-BAR circuits, (e.g., an input X-BAR and ePWM X-BAR) are used to control the operation of ePWM modules, among other circuitry. Trip events can be provided to an ePWM module from an X-BAR circuit by enabling one or more chip-level sources. In examples disclosed herein, such inputs are also provided to trip logger circuitry to enable the sequence and/or timing of the trip events to be captured. Existing circuits do not capture such timing and/or sequence information. Thus, in existing circuits, when a failure is detected, multiple trip events may be active, but without any way to identify the order in which the trip events occurred, and/or whether the trip events were contemporaneous with each other (e.g., how quickly a subsequent trip event followed a previous trip event).

Examples disclosed herein utilize trip logger circuitry to record a sequence and/or timing of trip events. In some examples, a trip event is used to indicate that a fault has occurred. In such an example, a system (e.g., a circuit) can be stopped or taken to an idle state and inspected to determine the source of a first fault and any subsequent faults to analyze whether they are unique (e.g., isolated) or dependent faults. Such an analysis enables more informed decisions to be made to restore the system (e.g., restart system, replace system, etc.). In some other examples, a trip event does not represent a fault (e.g., a failure), but instead represents a change in a state or phase of a circuit. In such an example, the sequence and/or timing of the trip events may be used for statistical and/or performance analysis.

In some other examples, an external logic circuit separate from the trip logger circuitry may provide trip events for logging. Such trip events may be used to demarcate certain phases and/or areas of a process along with the trip events to assist in debug and/or analysis.

FIG. 1 is a block diagram of an example environment in which example trip logger circuitry operates to perform real-time trip sequence detection for cascaded trip events. In the illustrated example of FIG. 1, the trip logger circuitry 100 is to perform real-time trip sequence detection for cascaded trip events. The example trip logger circuitry 100 monitors trip sources 105, 106, 107, 108, and communicates with logic circuitry 190.

The trip logger circuitry 100 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the trip logger circuitry 100 of FIG. 1 may be instantiated by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example trip logger circuitry 100 of the illustrated example of FIG. 1 includes trip detector circuitry 120, a trip identifier register 125, control circuitry 130, a first counter 135, a second counter 137, an event datastore 140, and communication circuitry 150. The example event datastore 140 includes an initial event memory 142 and an individual event memory 143. In some examples, the event datastore may additionally include one or more of a configuration memory 144, a software input memory 145, a polarity memory 146, an edge memory 147, an output memory 148, and/or a mapping memory 149.

The example trip sources 105, 106, 107, 108 of the illustrated example of FIG. 1 represent any source of an event that is to be logged. In examples disclosed herein, the trip sources 105, 106, 107, 108 provide digital logic values that can be interpreted by the example trip detector 120 of the example trip logger circuitry 100. While, in some examples, the example trip sources represent digital logic values, in some other examples one or more of the trip sources may be used to represent an analog logic value. An analog logic value (which may be represented by one or more digital logic values by way of an analog to digital converter), may be useful for detecting whether an element of a circuit is being operated at or above a particular level (e.g., at or above a voltage threshold).

The example trip detector circuitry 120 of the illustrated example of FIG. 1 receives inputs from the trip sources 105, 106, 107, 108, and monitors those inputs to detect a trip event. In some examples, the trip detector circuitry 120 additionally monitors for software trip events. Such software trip events (e.g., software-based events) may be presented to the trip detector circuitry 120 via the communication circuitry 150 (e.g., in response to the communication circuitry 150 receiving a communication from the logic circuitry 190), or alternatively, may be provided directly to the trip detector 120 by the logic circuitry 190. In some examples, the software trip events are identified to the trip detector circuitry 120 via a memory (e.g., via the software input memory 145). The trip detector circuitry 120, in response to detection of a trip event, controls a value stored in the trip identifier register 125 and conveys an indication that an event has occurred to the control circuitry 130.

In some examples, the trip detector circuitry 120 is includes a multiplexer. In some examples, circuitry in addition to a multiplexer may be used such as, for example, logic gates, filters, etc. In some examples, the trip detector circuitry 120 is capable of receiving and supporting two hundred and fifty-six separate hardware events (e.g., hardware-based events). However, any number of hardware events may be supported. In some examples, additional software events are also supported. In examples disclosed herein, the software input memory 145 (described below), enables the trip detector circuitry 120 to multiplex software events in additional to the hardware events. In examples disclosed herein, thirty-two software events are supported, however any number of software events may additionally or alternatively be supported.

In some examples, the trip detector circuitry 120 performs a mapping of the trip sources 105, 106, 107, 108 to a particular memory value which serves to identify the correct trip input source. Such mapping may be provided via, for example, the mapping memory 149 (described below). In some examples, only certain ones of the trip sources are mapped and, as a result, only a subset of the trip sources may be considered for logging. For example, the logic circuitry 190 may configure the mapping memory 149 such that only trip source 105, and trip source 107 are to be logged (e.g., trip source 106 and trip source 108 are to be ignored). In such an example, even though a trip may be detected via the trip source 106, the detected trip is not logged because trip source 106 is not mapped.

In some examples, the trip detector circuitry 120 is instantiated by programmable circuitry executing trip detector circuitry 120 instructions and/or configured to perform operations such as those represented by the flowchart(s) of FIG. 6.

In some examples, the trip logger circuitry 100 includes means for detecting. For example, the means for detecting may be implemented by trip detector circuitry 120. In some examples, the trip detector circuitry 120 may be instantiated by programmable circuitry such as the example programmable circuitry 812 of FIG. 8. For instance, the trip detector circuitry 120 may be instantiated by the example microprocessor 900 of FIG. 9 executing machine executable instructions such as those implemented by at least block 610 of FIG. 6. In some examples, trip detector circuitry 120 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the trip detector circuitry 120 may be instantiated by any other combination of hardware, software, and/or firmware. For example, the trip detector circuitry 120 may be implemented by at least one or more hardware circuits (e.g., processor circuitry, discrete and/or integrated analog and/or digital circuitry, an FPGA, an ASIC, an XPU, a comparator, a logic circuit, etc.) configured and/or structured to execute some or all of the machine readable instructions and/or to perform some or all of the operations corresponding to the machine readable instructions without executing software or firmware, but other structures are likewise appropriate.

The example trip identifier register 125 of the illustrated example of FIG. 1 stores a value representing a sequential identifier of a trip event (e.g., a trip storage location identifier). The value of the trip identifier register 125 is incremented by the trip detector circuitry 120 in response to detection of a trip event. In some examples, the trip identifier register 125 is used by the control circuitry 130 when storing information about the trip in the individual event memory 143. For example, the control circuitry 130 may utilize the value of the trip identifier register 125 to determine where, within the individual event memory, a record of a detected trip is to be stored.

The example control circuitry 130 of the illustrated example of FIG. 1 controls storage of event information detected by the trip detector circuitry 120 in the event datastore 140. In some examples, the control circuitry 130 is instantiated by programmable circuitry executing control circuitry instructions and/or configured to perform operations such as those represented by the flowchart(s) of FIG. 6.

In some examples, the trip logger circuitry 100 includes means for controlling. For example, the means for determining may be implemented by control circuitry 130. In some examples, the control circuitry 130 may be instantiated by programmable circuitry such as the example programmable circuitry 812 of FIG. 8. For instance, the control circuitry 130 may be instantiated by the example microprocessor 900 of FIG. 9 executing machine executable instructions such as those implemented by at least blocks 620, 625, 635, 640 of FIG. 6. In some examples, control circuitry 130 may be instantiated by hardware logic circuitry, which may be implemented by an ASIC, XPU, or the FPGA circuitry

Figure 10:
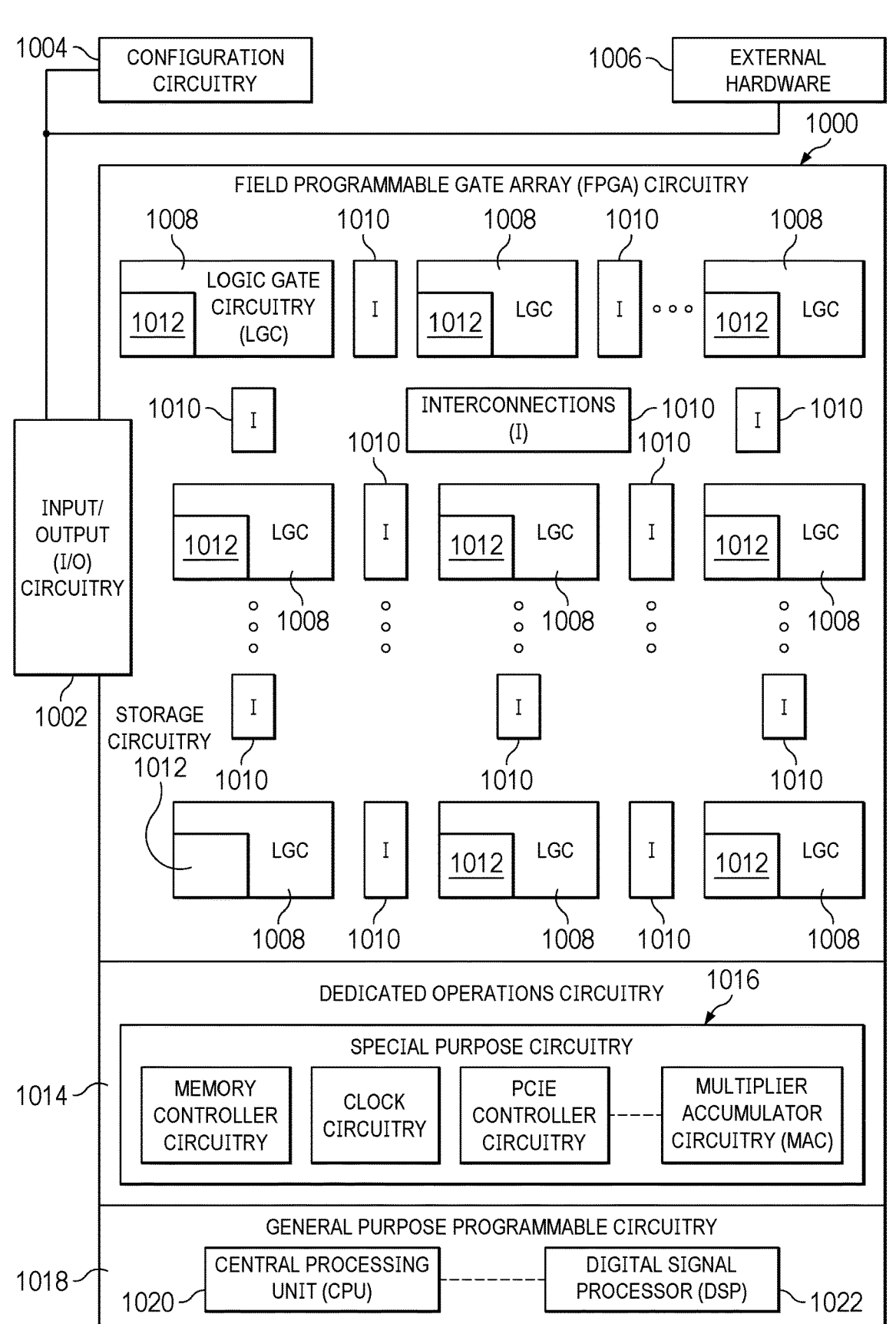
FIG. 10 is a block diagram of another example implementation of the programmable circuitry of FIG. 8.

1000 of FIG. 10 configured and/or structured to perform operations corresponding to the machine readable instructions. Additionally or alternatively, the control circuitry 130 may be instantiated by any other combination of hardware, software, and/or firmware. For example, the control circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example first counter 135 of the illustrated example of FIG. 1 is implemented by a sixty-four bit counter. However, any size counter may be used. In some examples, the first counter 135 is incremented based on a clock signal. In this manner, the value of the counter can be used to represent a timestamp. The example control circuitry 130, in response to detection of a first event, stores the value of the first counter 135 in the initial event memory 142. Storing the value of the first counter 135 in the initial event memory 142 enables later review of the stored values (e.g., in the initial event memory 142 and the individual event memory 143) to analyze the root cause of a failure.

The example second counter 137 of the illustrated example of FIG. 1 is implemented by a sixty-four bit counter. However, any size counter may be used (e.g., a sixteen bit counter). In some examples, both the first counter 135 and the second counter 137 are implemented using a same counter (e.g., a single counter device). In other examples, because the first counter 135 is used to measure time from boot to a first fault, which tends to be longer, and because the second counter 137 is used to measure time from the first fault to a second fault, which tends to be shorter, the second counter 137 has relatively fewer bits.

In some examples, the second counter 137 is implemented with pre-scale support to reduce the number of bits used to represent a given point in time. In some examples, the second counter 137 is incremented based on a clock signal. In examples where pre-scale support is utilized, the second counter 137 may be incremented based on a division of the clock signal. In this manner, the value of the counter can be used to represent a timestamp. The example control circuitry 130, in response to detection of an event, stores the value of the second counter 137 in the individual event memory 143. Storing the value of the second counter 137 in the initial event memory 143 enables later review of the stored values to analyze the sequence in which trip events occurred and/or the amount of time elapsed between the events.

The example event datastore 140 of the illustrated example of FIG. 1 is implemented by any memory, storage device and/or storage disc for storing data such as, for example, registers, flash memory, magnetic media, optical media, solid state memory, hard drive(s), thumb drive(s), etc. Furthermore, the data stored in the example event datastore 140 may be in any data format such as, for example, binary data, etc. While, in the illustrated example, the event datastore 140 is illustrated as a single device, the example event datastore 140 and/or any other data storage devices described herein may be implemented by any number and/or type(s) of memories or registers. In the illustrated example of FIG. 1, the example event datastore 140 includes the initial event memory 142 and the individual event memory 143. In some examples, the event datastore may additionally include one or more of a configuration memory

144, a software input memory 145, a polarity memory 146, an edge memory 147, an output memory 148, and/or a mapping memory 149. While in the illustrated example of FIG. 1, the memories are shown as a single element (e.g., the event datastore 140), in some examples, the memories may be implemented separately. In such examples where the memories are implemented separately, the various memories may be implemented using different memory technologies. For example, while the individual event memory may be implemented using a register, other memories (e.g., the configuration memory 144) may be implemented using flash memory.

The example initial event memory 142 of the illustrated example of FIG. 1 is implemented by a register that stores a timestamp. Understanding a time at which an initial trip occurred is useful for debugging and/or analyzing performance of a circuit. In some examples, the initial event memory 142 is configured to match a size of the first counter 135. However, in some examples, the initial event memory 142 may be a different size than the first counter 135, such that the counter is transformed and/or modified by the control circuitry 130 before storage in the initial event memory 142.

The example individual event memory 143 of the illustrated example of FIG. 1 is implemented by sixteen ninety-six-bit registers. However, any number of registers (or other memory technology) having any size may additionally or alternatively be used. In examples disclosed herein, each ninety-six bit value is sub-divided into two sections, a first section representing a source of the trip event (e.g., a first thirty-two bits), and a second portion representing a value of the second counter 137 at a time when the trip event was detected (e.g., a sixty-four bit timestamp). In some examples, the individual event memory is implemented using a first-in-first-out (FIFO) memory. In some examples, once the individual event memory 143 is full (e.g., each of the 16 ninety-six bit registers have been written to), no additional events are logged until after a reset command has been received.

While in the illustrated example of FIG. 1, sixteen ninety-six-bit memories are used, in some examples, other size memories may be used. That is, the individual event memory 143 may be implemented by any number of registers having any size. For example, the individual event memory may alternatively be implemented by eight sixty-four-bit registers. In such an example, the second counter 137 may be implemented using a thirty-two bit counter, resulting in the remainder of the sixty-four bit register being used to identify a source (or sources) of each trip event.

Moreover, in some examples, different size timestamps may be used between the initial event memory 142 and the individual event memory 143. For example, the initial event memory 142 may be capable of storing a one-hundred and twenty-eight-bit timestamp (and the first counter 135 may be implemented using a one-hundred and twenty-eight-bit counter), whereas the individual event memory 143 may be capable of storing sixty-four-bit timestamps.

The example configuration memory 144 of the illustrated example of FIG. 1 is implemented by a register that is to hold setup and control bits/fields like an enable bit, a first in first out (FIFO) reset instruction, a FIFO threshold, a FIFO overflow value, etc. Values of the example configuration memory may be provided by, for example, the logic circuitry 190 via the communication circuitry 150.

The example software input memory 145 of the illustrated example of FIG. 1 is implemented by a register that enables a user to generate unique SW Input events that can be logged to the individual event memory 143. In examples disclosed herein, the software input memory 145 is used to convey the occurrence of software events to the trip detector circuitry 120. In some examples, the register is implemented by a thirty-two-bit register. In such an example, a first bit (e.g., bit 0) represents a first software event (SW_Input_Event0), a second bit (e.g., bit 1) represents a second software event (SW_Input_Event1), etc. In some examples, the logic circuitry 190, via the communication circuitry 150, will write a one to a particular bit to identify the occurrence of a software event, and the control circuitry 130 will cause the bit to be cleared once the event is logged. In some examples, in order to log the software event to the individual event memory 143, the software event is also mapped via the mapping memory 149.

The example polarity memory 146 of the illustrated example of FIG. 1 is implemented by a register that stores information to allow configuration of whether to invert or not-invert each trip source. In some examples, the trip sources 105, 106, 107, 108 may be active when in a low state (e.g., as opposed to being active in a high state). Based on such configuration, the trip detector circuitry 120 detects a trip on a falling edge (representing an inverted trip). Such configuration information is primarily intended to be used for trip sources being sourced from hardware input events, but is equally applicable to software events. Values of the example polarity memory 146 may be provided by, for example, the logic circuitry 190 via the communication circuitry 150.

The example edge memory 147 of the illustrated example of FIG. 1 is implemented by a register that stores values representing whether a trip in connection with respective trip sources should be detected based on a rising edge, a falling edge, or both a rising edge and a falling edge. Coupled with the polarity memory 146, all permutations of signals into the trip detector circuitry 120 are accounted for. For example, logging an event on a rising edge captures an assertion of an event (e.g., a trip source has been activated), while logging events on both a rising edge and a falling edge allows for capturing of both the assertion and de-assertion of the event. Of note, logging on both edges will increase the amount of data being written to the individual event memory 143, which could result in the individual event memory filling up more quickly. Values of the example edge memory 147 may be provided by, for example, the logic circuitry 190 via the communication circuitry 150.

The example output memory 148 of the illustrated example of FIG. 1 is implemented by a register that holds current values of the outputs of the trip detector circuitry 120. In some examples, the output memory 148 can only be written to by the trip detector circuitry 120. In some examples, the output memory 148 is continuously updated with any change to the sources mapped to outputs of the trip detector circuitry 120.

The example mapping memory 149 of the illustrated example of FIG. 1 is implemented by one or more registers that map the trip sources 105, 106, 107, 108 and/or software events to an output of the trip detector circuitry 120. In some examples, the example mapping memory 149 includes thirty-two registers, resulting in a total of thirty-two trip sources (e.g., hardware trip sources) and/or software trip sources. Values of the example mapping memory 149 may be provided by, for example, the logic circuitry 190 via the communication circuitry 150 to, for example, select particular sources for logging.

The example communication circuitry 150 the illustrated example of FIG. 1 enables the logic circuitry 190 to communicate with the trip logger circuitry 100. In some examples, the communication circuitry 150 is implemented to allow direct memory access (DMA) communication between the event datastore 140 and the logic circuitry 190. However, any other type of communication protocol and/or approach may additionally or alternatively be used such as, for example, a serial bus, an inter-integrated circuit (I2C) bus, etc.

Figure 7:
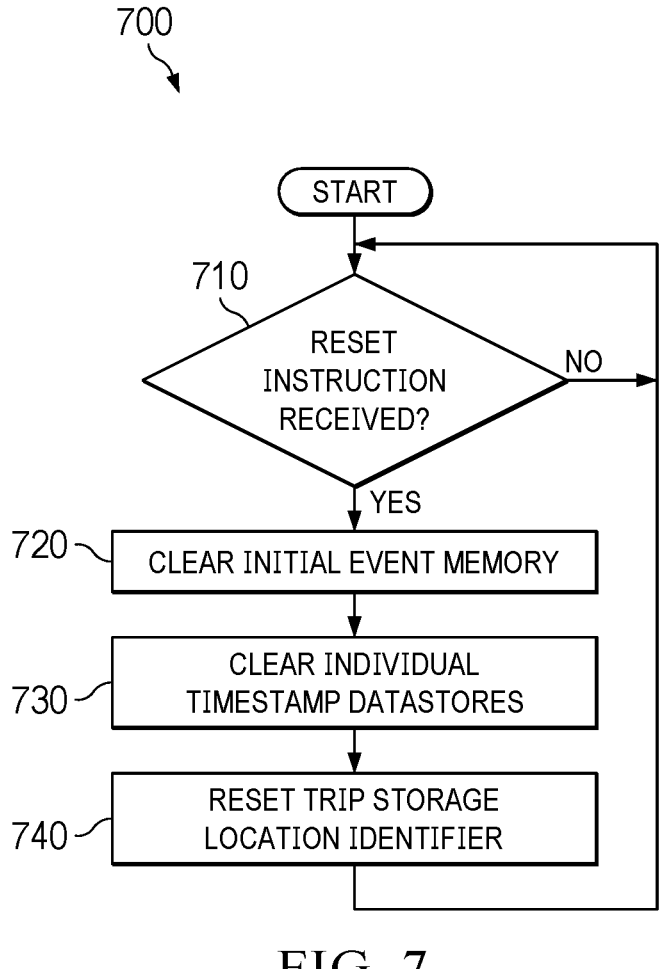
FIG. 7 is a flowchart representative of example machine readable instructions and/or example operations that may be executed, instantiated, and/or performed by example programmable circuitry to implement the trip logger circuitry of FIG. 1.

In some examples, the communication circuitry 150 is instantiated by programmable circuitry executing communication circuitry 150 instructions and/or configured to perform operations such as those represented by the flowchart(s) of FIG. 7.

In some examples, the trip logger circuitry 100 includes means for communicating. For example, the means for communicating may be implemented by communication circuitry 150. In some examples, the communication circuitry 150 may be instantiated by programmable circuitry such as the example programmable circuitry 812 of FIG. 8. For instance, the communication circuitry 150 may be instantiated by the example microprocessor 900 of FIG. 9 executing machine executable instructions such as those implemented by at least blocks 710, 720, 730, 740 of FIG. 7. In some examples, the communication circuitry 150 may be instantiated by hardware logic circuitry, which may be implemented by an ASIC, XPU, or the FPGA circuitry 1000 of FIG. 10 configured and/or structured to perform operations corresponding to the machine readable instructions. Additionally or alternatively, the communication circuitry 150 may be instantiated by any other combination of hardware, software, and/or firmware. For example, the communication circuitry 150 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example logic circuitry 190 of the illustrated example of FIG. 1 represents circuitry external to the trip logger circuitry 190 that retrieves the results of the trip logging process and/or provides configuration information to the trip logger circuitry 100. The example logic circuitry 190 communicates with the communication circuitry 150 using, for example, direct memory access (DMA). However, any other protocol for communicating with the trip logger circuitry 100 may additionally or alternatively be used. For example, the logic circuitry 190 may communicate with the communication circuitry 150 via a serial bus, an inter-integrated circuit (I2C) bus, etc. In some examples, the logic circuitry 190 identifies the occurrence of software events to the communication circuitry 150 for logging by the trip logger circuitry 100. In some examples, the communication circuitry 150 provides an indication to the trip detector circuitry 120 that a software event has been received.

Figure 2:
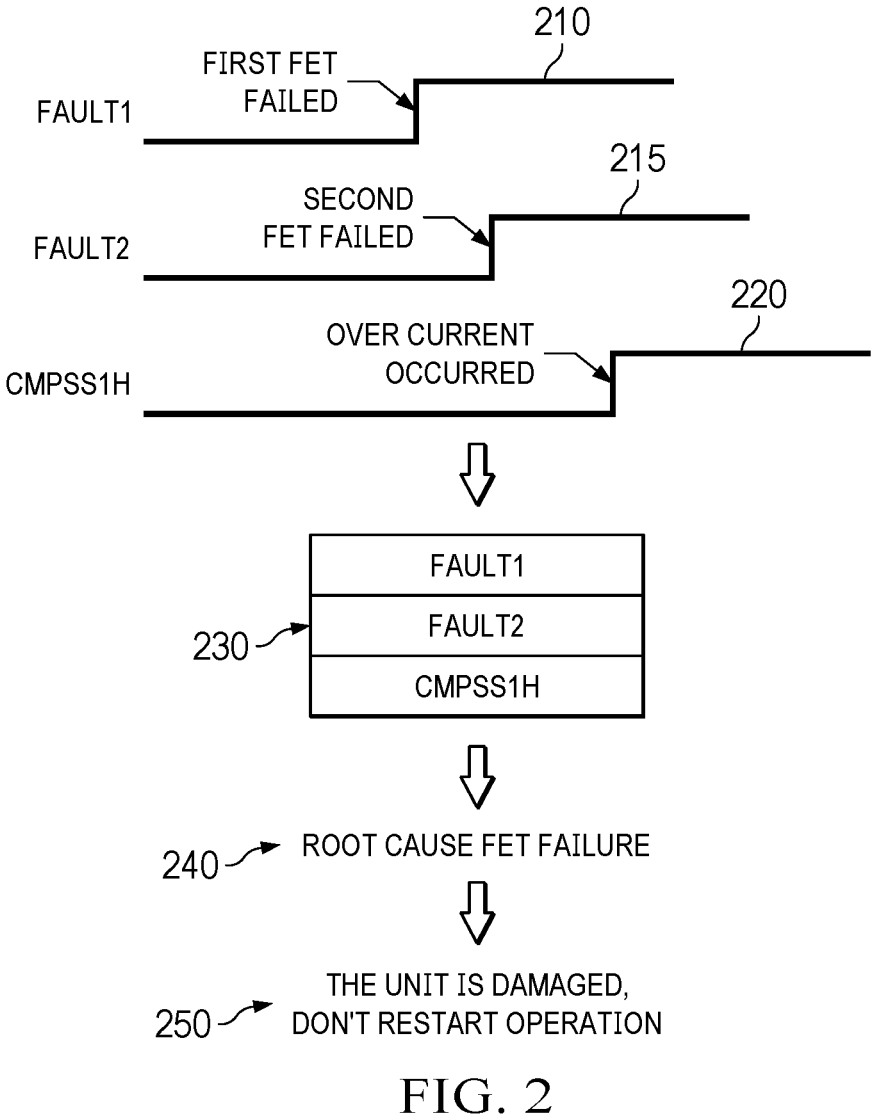
FIG. 2 is a diagram illustrating an example sequence of events and a determination of a root cause of a failure.

FIG. 2 is a diagram illustrating an example sequence of events and a determination of a root cause of a failure. In the illustrated example of FIG. 2, a first waveform 210 represents a trip of a first field effect transistor (FET) (e.g., a first trip source). A second waveform 215 represents a trip of a second FET. A third waveform 220 represents detection of an over-current condition (represented by the name "CMPSS1H"). In the illustrated example of FIG. 2, the ordering of the trip events is represented by the first waveform 210, the second waveform 215, and then the third waveform 220 (in order). In the illustrated example of FIG. 2, the table 230 represents the order of the trips logged in the individual event memory 143 in the order "fault1", "fault2", and "CMPSS1H". Later analysis of this ordering of events may identify that the root cause 240 was the failure of the first FET. Such a root cause may indicate 250 that the unit is damaged, and that an appropriate resolution should be disabling the circuit (e.g., to prevent further damage and/or malfunction).

Figure 3:
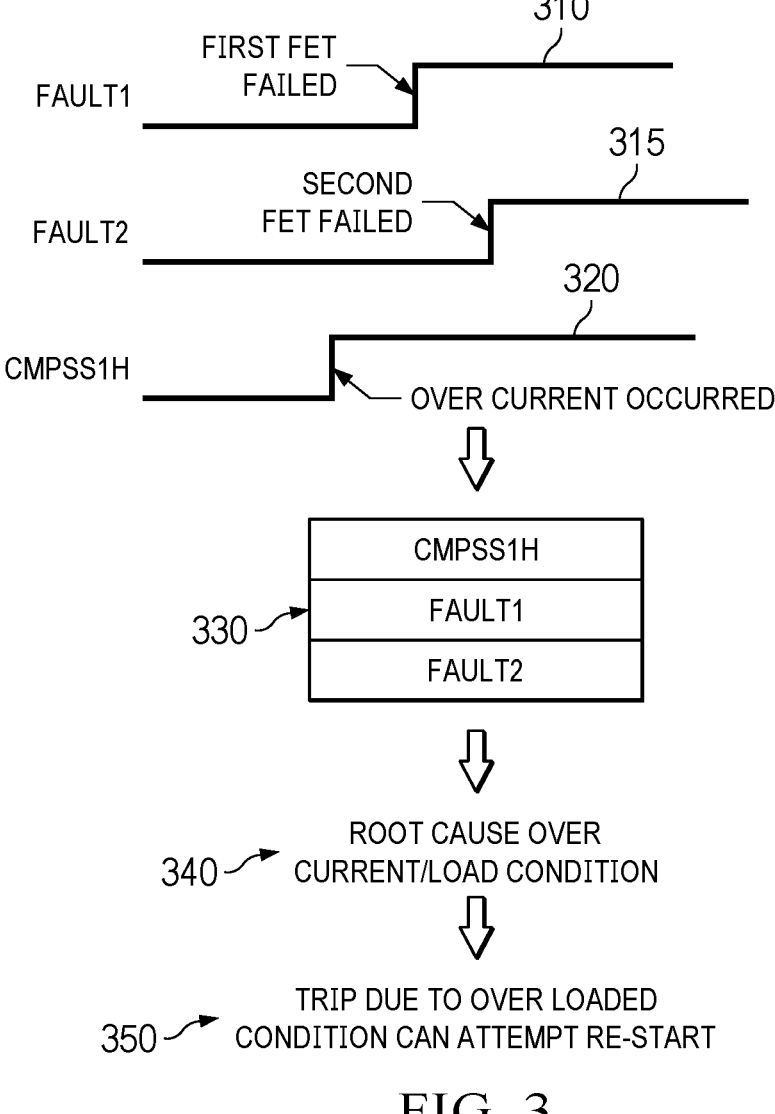
FIG. 3 is a diagram illustrating an alternative example sequence of events and a determination of a root cause of a failure.

FIG. 3 is a diagram illustrating an alternative example sequence of events and a determination of a root cause of a failure. In the illustrated example of FIG. 3, a first waveform 310 represents a trip of a first field effect transistor (FET) (e.g., a first trip source). A second waveform 315 represents a trip of a second FET. A third waveform 320 represents detection of an over-current condition (represented by the name "CMPSS1H"). In the illustrated example of FIG. 3, the ordering of the trip events is represented by the third waveform 320, the first waveform 310, and then the second waveform 315 (in order). In the illustrated example of FIG. 3, a table 330 represents an order of the trips logged in the individual event memory 143 in the order "CMPSS1H", fault1", "fault2". Later analysis of this ordering of events may identify that the root cause 340 was the over current and/or load condition. Such a root cause may indicate 350 that a failure was due to an overloaded condition (e.g., an external stimuli), and that an appropriate resolution could be re-starting the circuitry.

Figure 4:
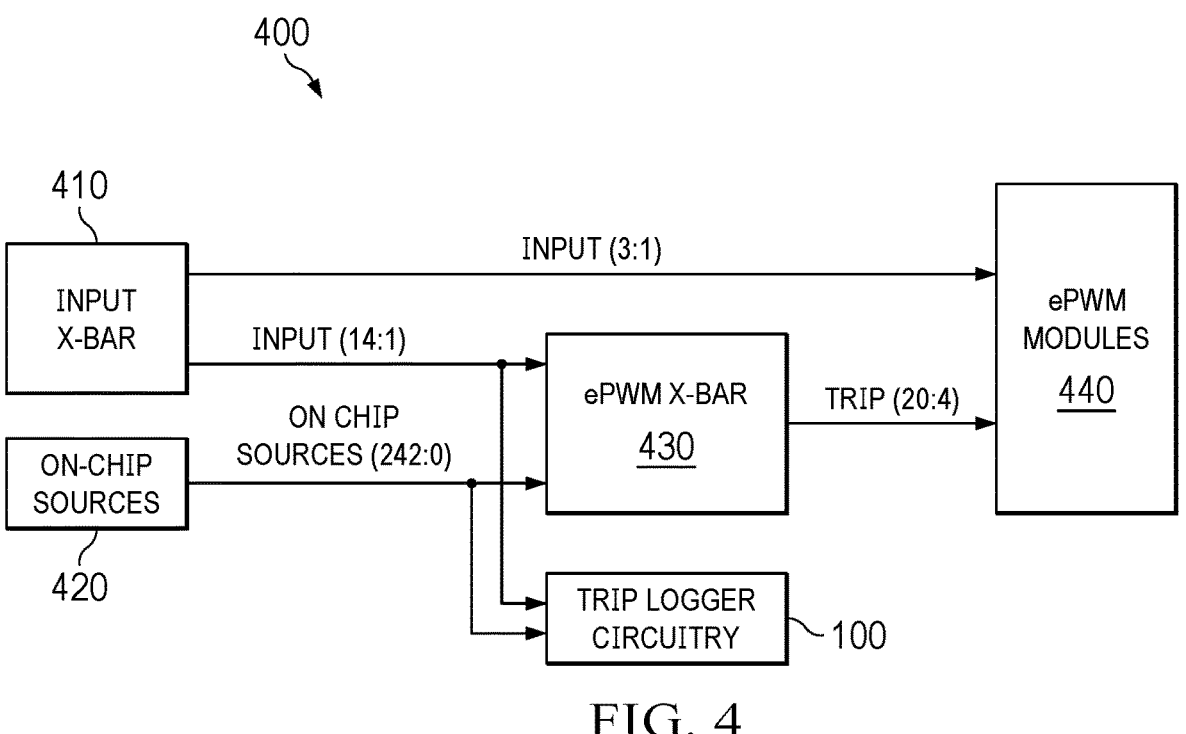
FIG. 4 is a block diagram illustrating an example environment of use in which the trip logger circuitry of FIG. 1 is implemented in connection with an enhanced pulse width modulator (ePWM) circuit.

FIG. 4 is a block diagram illustrating an example environment of use 400 in which the trip logger circuitry 100 of FIG. 1 is implemented in connection with an enhanced pulse width modulator (ePWM) circuit. The example environment of use 400 of FIG. 4 includes an input x-bar circuit 410, on-chip sources 420, an enhanced pulse width modulation (ePWM) x-bar circuit 430, and one or more ePWM modules 440. In the illustrated example of FIG. 4, the trip logger circuitry 100 receives inputs from the input x-bar circuit 410 and the on-chip sources 420. That is, the data provided from the input x-bar 410 and/or the on-chip sources 420 to the ePWM x-bar 430 are also provided to the trip logger circuitry 100. In this manner, the trip logger circuitry 100 logs the inputs to the ePWM x-bar 430. Such logging enables later analysis to determine, for example, a root cause of a failure of the circuits of the environment of use 400, performance characteristics of the circuits of the environment of use 400, etc.

In the illustrated example of FIG. 4, the input x-bar circuit 410 provides inputs to the ePWM x-bar 430 and the ePWM modules 440. The inputs provided from the input x-bar to the ePWM x-bar 430 are also provided to the trip logger circuitry 100. The example on-chip sources 420 provides inputs to the ePWM x-bar 430. The inputs provided from the on-chip sources 420 to the ePWM x-bar 430 are also provided to the trip logger circuitry 100. The ePWM x-bar 430 provides inputs to the ePWM modules 440. The ePWM modules use the inputs to, for example, generate pulse width modulated outputs for operating a load. Likewise, when the inputs indicate an error, the ePWM modules 440 can take a corrective action such as entering a safe state and the trip logger circuitry 100 can store information related to the error.

While in the illustrated example of FIG. 4, the trip logger circuitry 100 is shown as receiving the same inputs as the ePWM x-bar 430, the example trip logger circuitry 100 may be configured in any other fashion to receive any other inputs. For example, the trip logger circuitry 100 may additionally or alternatively receive data from the output of the ePWM x-bar 430. Moreover, while an example environment of use 400 is shown in connection with ePWM modules, the example trip logger circuitry 100 may be utilized in any other environment to log trip events.

FIG. 5 is a diagram illustrating an event timing waveform 510 and the resultant storage of event information in the individual event memory of FIG. 1. The example timing waveform 510 illustrates a first mapping 511 of a first input (SWINP[23]) to a first output of the trip detector circuitry 120 (MUX_O[0]), a second mapping 512 of a second input (HWINP[101]) to a second output of the trip detector circuitry 120 (MUX_O[1]), a third mapping 513 of a third input HWINP[4] to a third output of the trip detector circuitry 120 (MUX_O[2]), a fourth mapping 514 of a fourth input (HWINP[31]) to a fourth output of the trip detector circuitry 120 (MUX_O[3]), and a fifth mapping 515 of a fifth input (HWINP[81]) to a fifth output of the trip detector circuitry 120 (MUX_O[4]). In the illustrated example of FIG. 5, the mapping information used to map the various inputs to the outputs of the trip detector circuitry 120 is stored in the example mapping memory 149. In some examples, the output of the trip detector circuitry 120 (e.g., MUX_O[0], MUX_O[1], MUX_O[2], MUX_O[3], MUX_O[4], etc.) are stored in the example output memory 148.

A horizontal axis of the waveform 510 represents time. In the illustrated example of FIG. 5, the first input SWINP[23] is the first input to have a rising edge (e.g., a trip). This rising edge is detected by the trip detector circuitry 120 at a second clock cycle (represented by the value 2 of SYSCLK). In the illustrated example of FIG. 5, the control circuitry 130 stores the output of the trip detector circuitry 120 (e.g., the value of MUX_O) in the individual event memory, as well as a timestamp at which the event was detected. In the illustrated example of FIG. 5, the value of MUX_O is stored in the individual event memory 143, which is represented by a table 520 in FIG. 5. The example table 520 of FIG. 5 includes sixteen rows and two columns. The rows of the table 520 represent a sequence of detected trip events. The first column of the table 520 of FIG. 5 identifies a source (or sources) of the detected trip. The second column of the table 520 represents a timestamp at which the trip was detected.

While in the illustrated example of FIG. 5, the value of the output of the trip detector circuitry 120 is stored in the first column of the table 520 (which represents values of all of the captured and mapped inputs of the trip detector circuitry 120), in some examples, an individual value identifying which input triggered the trip may be stored. Storing an individual value identifying which input triggered the trip is useful for any diagnostic action by software later to identify the sequence of trip events and their sources.

In the illustrated example of FIG. 5, the value of the output of the trip detector circuitry 120, and the time at which the trip was detected are stored in the individual event memory as a result of a first trip 530. That is, the value 1 is stored in the first column of the first row of the table 520 (representing that SWINP[23] was active at the time of the trip), while a timestamp of 2h (representing the second clock cycle) is stored in the second column of the first row of the table 520.

In the illustrated example of FIG. 5, as a result of a second trip 540, the value 7h is stored in the first column of the second row of the table 520 (representing that SWINP[23], HWINP[101], and HWINP[4] were each active at the time of the trip), and a timestamp of 7h is stored in the second column of the second row of the table 520 (representing the time at which the second trip 540 was detected). The value of 7h stored in the first column of the second row of the table 520 represents that MUX_O[0], MUX_O[1], and MUX_O [2] were each active (and the remaining mapped multiplexed outputs were inactive). Thus, a binary value for MUX_O of 000_0111b, when converted to hexadecimal, is represented with a value of 0000_0007h.

As a result of a third trip 550, the value 10h is stored in the first column of the third row of the table 520 (representing that HWINP[81] was active at the time of the trip), and a timestamp of Dh is stored in the second column of the third row of the table 520 (representing the time at which the third trip 550 was detected).

While an example manner of implementing the trip logger circuitry 100 of FIG. 1 is illustrated in FIG. 1, one or more of the elements, processes, and/or devices illustrated in FIG. 1 may be combined, divided, re-arranged, omitted, eliminated, and/or implemented in any other way. Further, the trip detector circuitry 120, the control circuitry 130, the communication circuitry 150, and/or, more generally, the example trip logger circuitry 100 of FIG. 1, may be implemented by hardware alone or by hardware in combination with software and/or firmware. Thus, for example, any of the trip detector circuitry 120, the control circuitry 130, the communication circuitry 150, and/or, more generally, the example trip logger circuitry 100, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example trip logger circuitry 100 of FIG. 1 may include one or more elements, processes, and/or devices in addition to, or instead of, those illustrated in FIG. 1, and/or may include more than one of any or all of the illustrated elements, processes and devices.

Flowchart(s) representative of example machine readable instructions, which may be executed by programmable circuitry to implement and/or instantiate the trip logger circuitry 100 of FIG. 1 and/or representative of example operations which may be performed by programmable circuitry to implement and/or instantiate the trip logger circuitry 100 of FIG. 1, are shown in FIGS. 6 and/or 7. The machine readable instructions may be one or more executable programs or portion(s) of one or more executable programs for execution by programmable circuitry such as the programmable circuitry 812 shown in the example processor platform 800 discussed below in connection with FIG. 8 and/or may be one or more function(s) or portion(s) of functions to be performed by the example programmable circuitry (e.g., an FPGA) discussed below in connection with FIGS. 9 and/or 10. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6 and/or 7, many other methods of implementing the example trip logger circuitry 100 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and/or 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations that may be executed, instantiated, and/or performed by example programmable circuitry to implement the trip logger circuitry of FIG. 1 to log trip events. The example machine-readable instructions and/or the example operations 600 of FIG. 6 begin at block 610, where the trip detector circuitry 120 determines whether a trip has been identified. (Block 610). In examples disclosed herein, a trip may be identified by the trip detector circuitry 120 based on configuration information stored in the polarity memory 146, the edge memory 147, and/or the mapping memory 149. In other words, a trip may be detected on a rising edge of one or more of the trip source(s), on a falling edge of one or more of the trip source(s), etc. based on the configuration information stored in the polarity memory 146 and/or the edge memory 147. In some examples, even though a trip is detected from a hardware and/or software trip source, the example trip detector circuitry 120 may ignore the trip based on an enabling or disabling of the particular trip source. For example, if a trip source is not mapped in the mapping memory 149, the example trip detector circuitry 120 may ignore the corresponding trip source.

If no trip is detected by the trip detector circuitry 120 (e.g., block 610 returns a result of NO), the example trip detector circuitry 120 continues to monitor for a trip event. (Block 610).

If a trip event is detected by the trip detector circuitry 120 (e.g., block 610 returns a result of YES), the example control circuitry 130 determines whether the initial timestamp memory 142 is populated. (Block 620). If the initial timestamp memory 142 is not populated, the example control circuitry 130 populates the initial timestamp memory with an initial timestamp (e.g., a value of the first counter 135) and/or other information related to the trip such as a source, conditions associated with the trip, system parameters when the trip occurred, etc. After the initial timestamp memory is populated (Block 625) or a determination that the initial timestamp memory was already populated (Block 620 returns a result of YES), the example control circuitry 130 determines whether the trip storage location identifier is greater than the number of memory locations available in the individual event memory. (Block 635) (e.g., corresponding to the number of rows in the table 520 of FIG. 5). In examples disclosed herein, comparing the value of the trip identifier (e.g., the trip storage location identifier) to the number of memory locations in the individual event memory ensures that the individual event memory does not overflow. In this manner, only the first number of trip events (corresponding to the number of memory locations) are stored in the individual event memory. If the trip storage location identifier is greater than the number of memory locations in the individual event memory (e.g., block 635 returns a result of YES), control proceeds to return to block 610, where subsequent faults are detected.

If the trip storage location identifier is not greater than the number of memory locations in the individual event memory (e.g., block 635 returns a result of NO), the example control circuitry 130 stores a timestamp and/or other information related to the trip such as a source, conditions associated with the trip, system parameters when the trip occurred, etc., in the individual event memory based on the value of the trip storage location identifier. (Block 640). In examples disclosed herein, the trip storage location identifier is used as a pointer to identify the location in the individual event memory to which the trip event is to be logged. In some examples, a value representing multiple trip sources is stored in the individual event memory. For example, an output of the trip detector circuitry 120 representing the status of multiple inputs may be stored in the individual event memory 143 (e.g., as shown by the storage of MUX_O from FIG. 5). Alternatively, a single value identifying the trip source that triggered the trip event may be stored. Storing only the single value identifying the trip source may have the added benefit of reducing memory requirements, whereas storing indicators for multiple inputs may provide the added benefit of accounting for situations when two or more trip events occur contemporaneously.

The example trip detector circuitry 120 then increments the trip storage location identifier stored in the trip identifier register 125 (Block 650). Incrementing the trip storage location identifier enables subsequent trips to be logged sequentially in the individual event memory 143. Control then returns to block 610, where the example trip detector circuitry 120 continues to monitor for subsequent trip events.

FIG. 7 is a flowchart representative of example machine readable instructions and/or example operations that may be executed, instantiated, and/or performed by example programmable circuitry to implement the trip logger circuitry 100 of FIG. 1 to reset the trip logger circuitry 100. The example machine-readable instructions and/or the example operations 700 of FIG. 7 begin at block 710, at which the communication circuitry 150 monitors for whether a reset instruction has been received. (Block 710). In some examples, a reset instruction may be received from the logic circuitry 190. Such a reset instruction may be received after, for example, the logic circuitry 190 has retrieved values from the event memories (e.g., the initial event memory and/or the individual event memory). If no reset instruction is received (e.g., block 710 returns a result of NO), the example communication circuitry 150 continues to monitor for a reset instruction. After a reset instruction is received (e.g., block 710 returns a result of YES), the example communication circuitry 150 clears the initial timestamp stored in the initial timestamp memory 142. (Block 720). The example communication circuitry 150 clears the individual event memory 143. (Block 730). The example communication circuitry 150 causes the trip storage location identifier stored in the trip identifier register 125 to be reset. (Block 740). In some examples, the communication circuitry 150 may instruct the trip detector circuitry 130 and/or the control circuitry 130 to reset the trip storage location identifier stored in the trip identifier register 125. Control then proceeds to block 710, where the example communication circuitry 150 monitors for a subsequent reset instruction.

Figure 8:
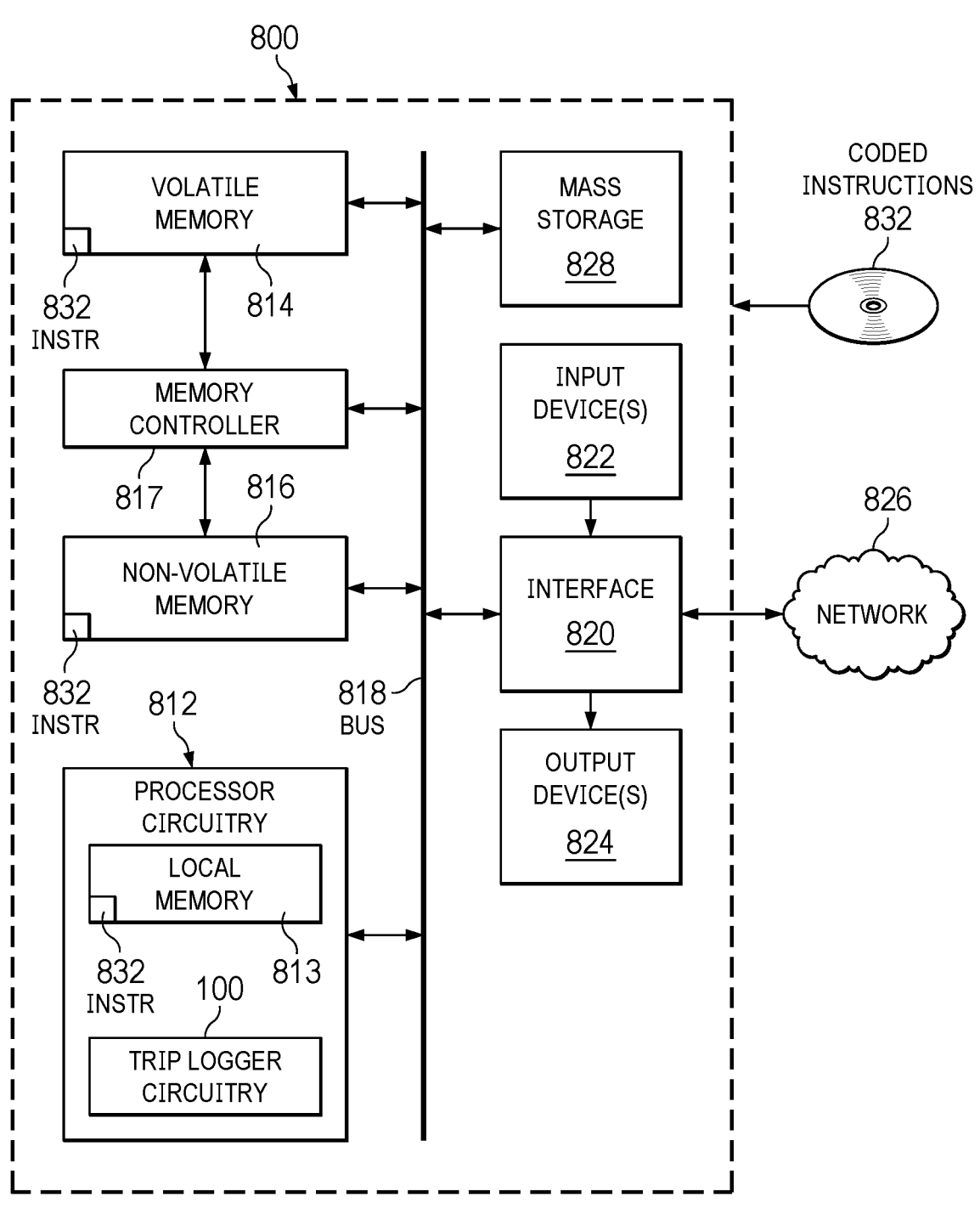
FIG. 8 is a block diagram of an example processing platform including programmable circuitry structured to execute, instantiate, and/or perform the example machine readable instructions and/or perform the example operations of FIGS. 6 and/or 7 to implement the trip logger circuitry 100 of FIG. 1.

FIG. 8 is a block diagram of an example programmable circuitry platform 800 structured to execute and/or instantiate the example machine-readable instructions and/or the example operations of FIGS. 6 and/or 7 to implement the trip logger circuitry 100 of FIG. 1. The programmable circuitry platform 800 can be, for example, a micro controller, a CPU, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the example trip logger circuitry 100. However, in some examples, the trip logger circuitry 100 may be implemented separately from the processor circuitry 812 and may communicate with the processor circuitry 812 via, for example, the bus 818.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIGS. 6 and/or 7, may be stored in the mass storage device 828, in the volatile memory 814, in the non-volatile memory 816, and/or on at least one non-transitory computer readable storage medium such as a CD or DVD which may be removable.

Figure 9:
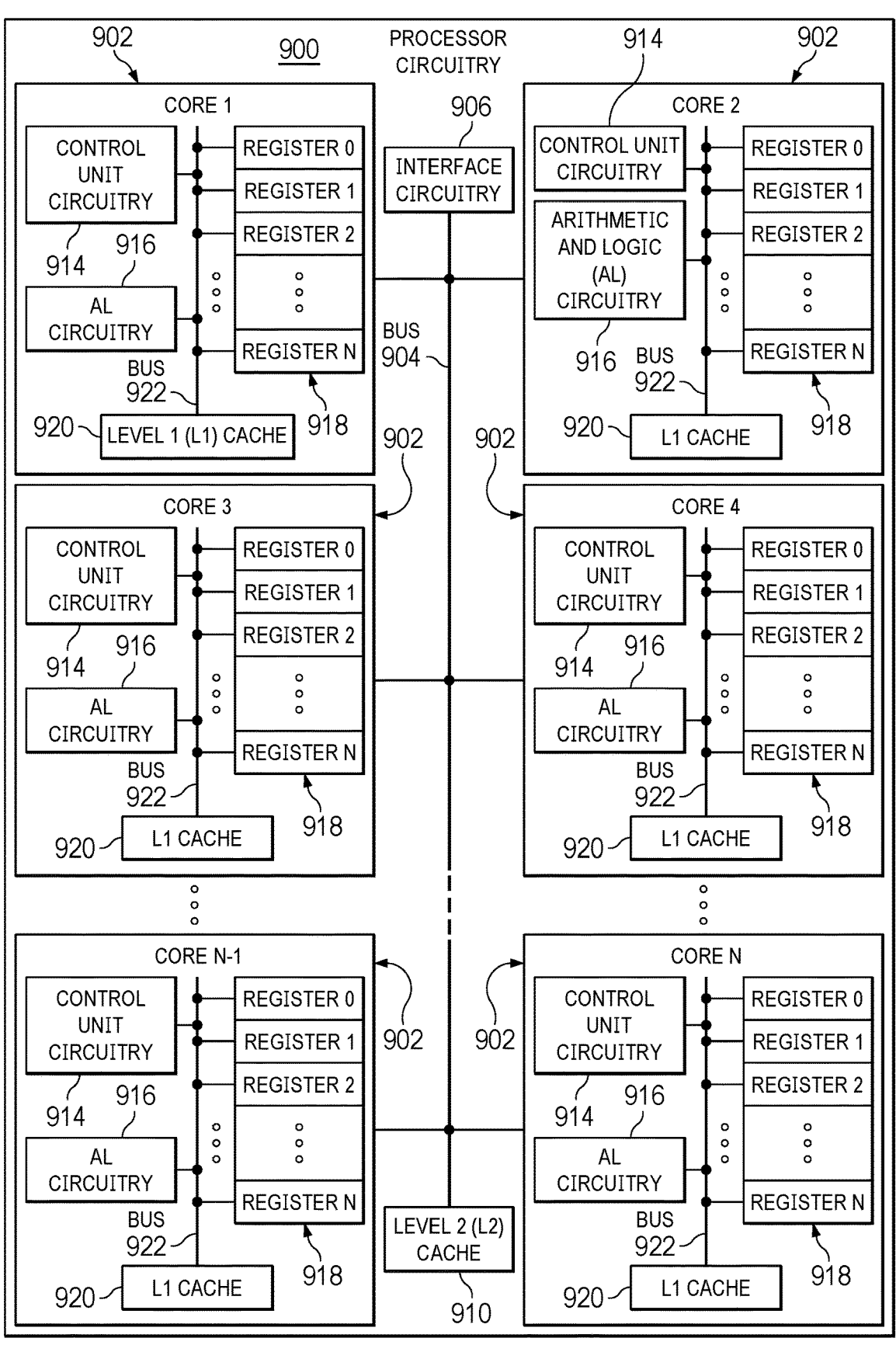
FIG. 9 is a block diagram of an example implementation of the programmable circuitry of FIG. 8.

FIG. 9 is a block diagram of an example implementation of the programmable circuitry 812 of FIG. 8. In this example, the programmable circuitry 812 of FIG. 8 is implemented by a microprocessor 900. For example, the microprocessor 900 may be a general-purpose microprocessor (e.g., general-purpose microprocessor circuitry). The microprocessor 900 executes some or all of the machine-readable instructions of the flowcharts of FIGS. 6 and/or 7 to effectively instantiate the circuitry of FIG. 1 as logic circuits to perform operations corresponding to those machine readable instructions. In some such examples, the circuitry of FIG. 1 is instantiated by the hardware circuits of the microprocessor 900 in combination with the machine-readable instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semi-conductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and/or 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8).

Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating-point operations. In yet other examples, the AL circuitry 916 may include first AL circuitry that performs integer-based operations and second AL circuitry that performs floating-point operations. In some examples, the AL circuitry 916 may be referred to as an Arithmetic Logic Unit (ALU).

The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register(s), segment register(s), machine-specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure, such as by being distributed throughout the core 902 to shorten access time. The second bus 922 may be implemented by at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The microprocessor 900 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 900, in the same chip package as the microprocessor 900 and/or in one or more separate packages from the microprocessor 900.

FIG. 10 is a block diagram of another example implementation of the programmable circuitry 812 of FIG. 8. In this example, the programmable circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 900 of FIG. 9 described above (which is a general purpose device that may be programmed to execute some or all of the machine readable instructions represented by the flowchart(s) of FIGS. 6 and/or 7 but whose interconnections and logic circuitry are fixed once fabricated), the FPGA circuitry 1000 of the example of FIG. 10 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 6 and/or 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 6 and/or 7. As such, the FPGA circuitry 1000 may be configured and/or structured to effectively instantiate some or all of the operations/functions corresponding to the machine readable instructions of the flowchart(s) of FIGS. 6 and/or 7 as dedicated logic circuits to perform the operations/functions corresponding to those software instructions in a dedicated manner analogous to an ASIC. Therefore, the FPGA circuitry 1000 may perform the operations/functions corresponding to the some or all of the machine readable instructions of FIGS. 6 and/or 7 faster than the general-purpose microprocessor can execute the same.

In the example of FIG. 10, the FPGA circuitry 1000 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1000 of FIG. 10 may access and/or load the binary file to cause the FPGA circuitry 1000 of FIG. 10 to be configured and/or structured to perform the one or more operations/functions.

For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1000 of FIG. 10 may access and/or load the binary file to cause the FPGA circuitry 1000 of FIG. 10 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1000 of FIG. 10 to cause configuration and/or structuring of the FPGA circuitry 1000 of FIG. 10, or portion(s) thereof.

The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain a binary file, which may be implemented by a bit stream, data, and/or machine-readable instructions, to configure the FPGA circuitry 1000, or portion(s) thereof. In some such examples, the configuration circuitry 1004 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1006 may be implemented by external hardware circuitry. For example, the external hardware 1006 may be implemented by the microprocessor 900 of FIG. 9.

The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations/functions that may correspond to at least some of the machine readable instructions of FIGS. 6 and/or 7 and/or other desired operations. The logic gate circuitry 1008 shown in FIG. 10 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations/functions. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example dedicated operations circuitry 1014. In this example, the dedicated operations circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the programmable circuitry 812 of FIG. 8, many other approaches are contemplated. For example, FPGA circuitry may include an on-board CPU, such as one or more of the example CPU 1020 of FIG. 9. Therefore, the programmable circuitry 812 of FIG. 8 may additionally be implemented by combining at least the example microprocessor 900 of FIG. 9 and the example FPGA circuitry 1000 of FIG. 10. In some such hybrid examples, one or more cores 902 of FIG. 9 may execute a first portion of the machine readable instructions represented by the flowchart(s) of FIGS. 6 and/or 7 to perform first operation(s)/function(s), the FPGA circuitry 1000 of FIG. 10 may be configured and/or structured to perform second operation(s)/function(s) corresponding to a second portion of the machine readable instructions represented by the flowcharts of FIGS. 6 and/or 7, and/or an ASIC may be configured and/or structured to perform third operation(s)/function(s) corresponding to a third portion of the machine readable instructions represented by the flowcharts of FIGS. 6 and/or 7.

It should be understood that some or all of the circuitry of FIG. 1 may, thus, be instantiated at the same or different times. For example, same and/or different portion(s) of the microprocessor 900 of FIG. 9 may be programmed to execute portion(s) of machine-readable instructions at the same and/or different times. In some examples, same and/or different portion(s) of the FPGA circuitry 1000 of FIG. 10 may be configured and/or structured to perform operations/functions corresponding to portion(s) of machine-readable instructions at the same and/or different times.

In some examples, some or all of the circuitry of FIG. 1 may be instantiated, for example, in one or more threads executing concurrently and/or in series. For example, the microprocessor 900 of FIG. 9 may execute machine readable instructions in one or more threads executing concurrently and/or in series. In some examples, the FPGA circuitry 1000 of FIG. 10 may be configured and/or structured to carry out operations/functions concurrently and/or in series. Moreover, in some examples, some or all of the circuitry of FIG. 1 may be implemented within one or more virtual machines and/or containers executing on the microprocessor 900 of FIG. 9.

In some examples, the programmable circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the programmable circuitry 812 of FIG. 8, which may be in one or more packages. For example, the XPU may include a CPU (e.g., the microprocessor 900 of FIG. 9, the CPU 1020 of FIG. 10, etc.) in one package, a DSP (e.g., the DSP 1022 of FIG. 10) in another package, a GPU in yet another package, and an FPGA (e.g., the FPGA circuitry 1000 of FIG. 10) in still yet another package.

From the foregoing, it will be appreciated that example systems, apparatus, articles of manufacture, and methods have been disclosed that enable logging and/or capture of the sequence and/or timing of trip events. Disclosed systems, apparatus, articles of manufacture, and methods improve the efficiency of using a computing device by facilitating the use of such sequence and/or timing information in the analysis and/or determination of a root cause of an issue occurring in a circuit. Disclosed systems, apparatus, articles of manufacture, and methods are accordingly directed to one or more improvement(s) in the operation of a machine such as a computer or other electronic and/or mechanical device.

It is noted that this patent claims priority from U.S. Provisional Patent Application No. 63/431,656, which was filed on Apr. 25, 2023, and is hereby incorporated by reference in its entirety.

Example methods, apparatus, systems, and articles of manufacture to for real-time sequence detection for cascaded trip events are disclosed herein. Further examples and combinations thereof include the following:

Example 1 includes an integrated circuit device comprising trip detector circuitry, a first counter, a first memory, a second counter, a second memory, and control circuitry in communication with the trip detector circuitry, the control circuitry to in response to a first trigger detected by the trip detector circuit, store a value of the first counter in the first memory, and in response to a second trigger detected by the trip detector circuit, store a value of the second counter in the second memory.

Example 2 includes the integrated circuit device of example 1, wherein the first memory includes a sixty-four bit field configured to store a value of the first counter representing a timestamp of a first event.

Example 3 includes the integrated circuit device of example 2, wherein the first counter is a sixty-four bit counter.

Example 4 includes the integrated circuit device of example 1, wherein the second counter is a sixty-four bit counter with pre-scale support.

Example 5 includes the integrated circuit device of example 4, wherein the second memory includes a ninety-six bit field and the control circuitry is to store a portion of the value of the second counter and an identifier of a source of the second trip in the second memory.

Example 6 includes the integrated circuit device of example 4, further including a trip identifier register to store a trip storage location identifier, wherein the control circuitry is to store a portion of the second counter at a location in the second memory based on the trip storage location identifier.

Example 7 includes the integrated circuit device of example 6, wherein the trip detector circuitry is to increment the trip storage location identifier in response to detection of at least one of the first trigger or the second trigger.

Example 8 includes the integrated circuit device of example 1, further including communication circuitry to provide access to the values stored in the first memory and the second memory to a logic circuit separate from the integrated circuit device.

Example 9 includes the integrated circuit device of example 1, wherein the first trigger is a hardware-based trigger and the second trigger is a software-based trigger.

Example 10 includes the integrated circuit device of example 9, further including communication circuitry to enable logic circuitry external to the integrated circuit device to provide the software-based trigger.

Example 11 includes an apparatus to log trip events, the apparatus comprising interface circuitry, machine readable instructions, and programmable circuitry to at least one of instantiate or execute the machine readable instructions to detect a first trip via trip detector circuitry, store a first value of a first counter in a first memory, the first value representing a first time at which the first trip is detected, detect a second trip via the trip detector circuitry, and store a second value of the first counter in a second memory, the second value representing a second time at which the second trip is detected.

Example 12 includes the apparatus of example 11, further including the first memory, wherein the first memory is a sixty-four bit memory.

Example 13 includes the apparatus of example 12, further including the first counter, wherein the first counter is a sixty-four bit counter.

Example 14 includes the apparatus of example 11, wherein the second memory includes a ninety-six bit register and the programmable circuitry is to store the second value of the second counter and an identifier of a source of the second trip in the second memory.

Example 15 includes the apparatus of example 14, wherein the programmable circuitry is to store a portion of the second counter at a location in the second memory based on a value of a trip storage location identifier.

Example 16 includes the apparatus of example 15, wherein the programmable circuitry is to increment the trip storage location identifier in response to detection of at least one of the first trip or the second trip.

Example 17 includes the apparatus of example 11, wherein the interface circuitry is to provide access to the values stored in the first memory and the second memory to a logic circuit separate from the apparatus.

Example 18 includes the apparatus of example 11, wherein the first trip is a hardware-based trigger and the second trip is a software-based trigger.

Example 19 includes the apparatus of example 18, wherein the interface circuitry is to enable logic circuitry separate from the apparatus to provide the software-based trigger.

Example 20 includes a method for real-time trip sequence detection for cascaded trip events, the method comprising detecting, using trip detector circuitry, a first trip, storing, in response to the detection of the first trip by the trip detector circuitry, a first value of a first counter in a first memory, the first value representing a first time at which the first trip is detected, detecting, using the trip detector circuitry, a second trip, and storing, in response to the detection of the second trip by the trip detector circuitry, a second value of the first counter in a second memory, the second value representing a second time at which the second trip is detected. The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A device comprising:
   trip detector circuitry configured to detect trip events including a first trip event and a second trip event;
   a first counter configured to store a value representing a time of detection of the first trip event;
   a first memory;
   a second counter configured to store a value representing a time elapsed between detection of the first trip event and detection of the second trip event;
   a second memory; and
   control circuitry in communication with the trip detector circuitry and configured to:
      in response to the first trip event detected by the trip detector circuitry, store the value of the first counter in the first memory; and
      in response to the second trip event detected by the trip detector circuitry, store the value of the second counter in the second memory.

2. The device of claim 1, wherein the first memory includes a sixty-four bit field configured to store the value of the first counter.

3. The device of claim 2, wherein the first counter is a sixty-four bit counter.

4. The device of claim 1, wherein the second counter is a sixty-four bit counter with pre-scale support.

5. The device of claim 4, wherein the second memory includes a ninety-six bit field and the control circuitry is configured to store an identifier of a source of the second trip event, in addition to the value of the second counter, in the second memory.

6. The device of claim 4, further including a trip identifier register configured to store a trip storage location identifier, wherein the control circuitry is configured to store the value of the second counter at a location in the second memory based on the trip storage location identifier.

7. The device of claim 6, wherein the trip detector circuitry is configured to increment the trip storage location identifier in response to detection of at least one of the first trip event or the second trip event.

8. The device of claim 1, further including communication circuitry configured to provide the values stored in the first memory and the second memory to a logic circuit separate from the device.

9. The device of claim 1, wherein the first trip event is a hardware-based trip event and the second trip event is a software-based trip event.

10. The device of claim 9, further including communication circuitry configured to enable logic circuitry external to the device to provide a trigger signal for the software-based trip event.

11. An apparatus comprising:
    a first counter configured to store a first value representing a time of detection of a first trip event;

a second counter configured to store a second value representing a time elapsed between detection of the first trip event and detection of a second trip event;
interface circuitry;
memory configured to store instructions; and
programmable circuitry configured to execute the instructions to:
   detect the first trip event via trip detector circuitry;
      store the first value of a first counter in a first memory;
      detect the second trip event via the trip detector circuitry; and
      store the second value of a second counter in a second memory that is distinct from the first memory.

12. The apparatus of claim 11, further including the first memory, wherein the first memory is a sixty-four bit memory.

13. The apparatus of claim 12, further including the first counter, wherein the first counter is a sixty-four bit counter.

14. The apparatus of claim 11, wherein the second memory includes a ninety-six bit register and the programmable circuitry is configured to execute the instructions to store an identifier of a source of the second trip event, in addition to the second value of the second counter, in the second memory.

15. The apparatus of claim 14, wherein the programmable circuitry is configured to execute the instructions to store the second value of the second counter at a location in the second memory based on a value of a trip storage location identifier.

16. The apparatus of claim 15, wherein the programmable circuitry is configured to execute the instructions to increment the trip storage location identifier in response to detection of at least one of the first trip event or the second trip event.

17. The apparatus of claim 11, wherein the interface circuitry is configured to provide the first and second values stored in the first memory and the second memory to a logic circuit separate from the apparatus.

18. The apparatus of claim 11, wherein the first trip event is a hardware-based trip event and the second trip event is a software-based trip event.

19. The apparatus of claim 18, wherein the interface circuitry is configured to enable logic circuitry separate from the apparatus to provide a trigger signal for the software-based trip event.

20. A method comprising:
    counting, by a first counter, a first value to represent a time elapsed between boot of a system and detection of a first trip of the system by trip detector circuitry;
    storing, in response to the detection of the first trip by the trip detector circuitry, the first value of a first counter in a first memory;
    counting, by a second counter, a second value to represent a time elapsed between detection of the first trip and detection of a second trip of the system by the trip detector circuitry; and
    storing, in response to the detection of the second trip by the trip detector circuitry, the second value of the first counter in a second memory that is distinct from the first memory.

21. A system comprising:
    a first crossbar circuit configured to produce a first signal and second signal;
    a data source configured to produce a third signal;
    a second crossbar circuit coupled to the first crossbar circuit and to the data source, the second crossbar circuit configured to:

receive the second signal;

receive the third signal; and produce a fourth signal based on the second signal and the third signal;

pulse width modulation (PWM) modules coupled to the first crossbar circuit and to the second crossbar circuit, wherein the PWM modules are configured to produce PWM signals based on the first signal and the fourth signal; and trip logger circuitry coupled to the first crossbar circuit and to the data source, the trip logger circuitry configured to:

detect a first trip event and a second trip event based on the second signal or the third signal;

store a value representing a time of detection of the first trip event in a first counter;

store a value representing a time elapsed between detection of the first trip event and detection of the second trip event in a second counter;

in response to detecting the first trip event, store the value of the first counter in a first memory; and in response to detecting the second trip event, store the value of the second counter in a second memory.

\* \* \* \* \*